Jan. 24, 1956    C. F. U. STONER    2,732,151
HYDRAULIC STEERING MECHANISM
Filed Feb. 16, 1952    2 Sheets-Sheet 1
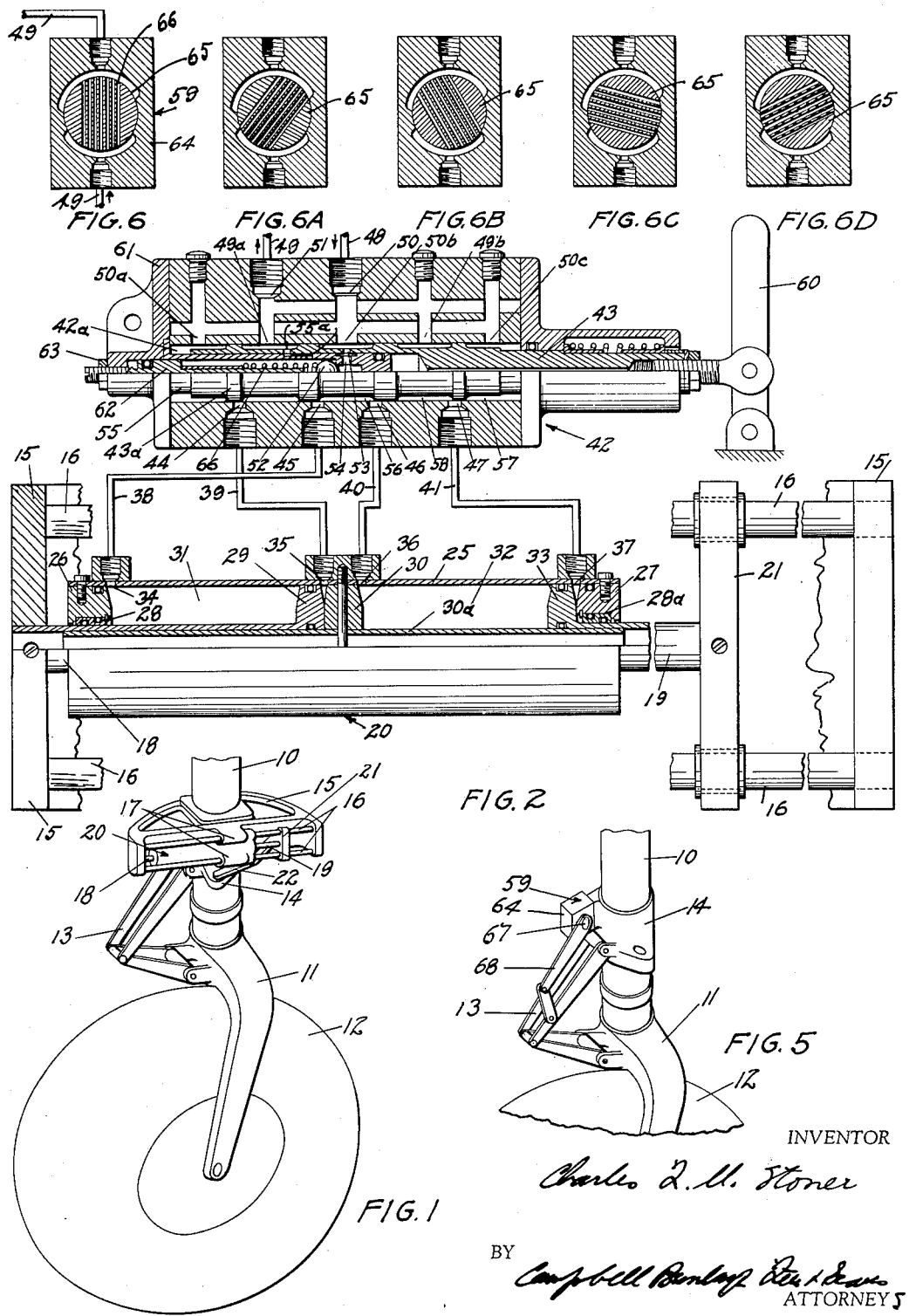
INVENTOR
Charles F. U. Stoner
BY
Campbell Bentley Lee & Davis
ATTORNEYS Jan. 24, 1956     C. F. U. STONER     2,732,151
HYDRAULIC STEERING MECHANISM Filed Feb. 16, 1952     2 Sheets-Sheet 2

INVENTOR
Charles F. U. Stoner
BY Campbell Brumbaugh Free & Graves
ATTORNEYS

United States Patent Office 2,732,151
Patented Jan. 24, 1956

2,732,151
HYDRAULIC STEERING MECHANISM

Charles F. U. Stoner, Waynesboro, Pa.

Application February 16, 1952, Serial No. 271,955

19 Claims. (Cl. 244—50)

This invention relates to hydraulic steering mechanisms, and has particular reference to mechanism for hydraulically steering the nose wheel of aircraft tricycle landing gear, although the invention is not limited to that use.

One of the major problems arising from the use of steerable nose wheels is the prevention of wheel shimmy which, if not controlled or damped, may build up in amplitude and magnitude to destructive proportions. It has been determined that the force needed to prevent the start of shimmy of the wheel is somewhat less than the force required to caster the wheel freely for turning the airplane. If, for a given airplane it is determined that the force needed to prevent shimmy is on the order of 3000 pounds and the force needed for castering the wheel is on the order of 5000 pounds, shimmy can be prevented from starting if the wheel can be restrained by a force of 4000 pounds at all times, which will still allow the wheel to be swivelled.

The various means used in the unsuccessful attempt to control nose wheel shimmy have allowed the shimmy to develop and then sought to damp it, and have included locks, springs, complicated fluid metering devices, dashpots, and the like. Inasmuch as shimmy is permitted by the necessary wheel freedom to caster, the restraint on shimmy imposed by these prior devices also restricts castering of the wheel.

In accordance with the present invention, an hydraulic steering mechanism for the nose wheel of aircraft tricycle landing gear is provided which eliminates wheel shimmy on landing and take-off by preventing shimmy from starting and without interference with free castering of the wheel.

In a preferred embodiment of the invention, hydraulic steering mechanism mounted on the shock strut of the steerable wheel rotates the wheel to the left or right as directed by the movement of the control lever, the mechanism being under a predetermined hydraulic pressure at all times to preclude shimmy, but not castering, i. e., the wheel is subjected to a restraining force on the order of 4000 pounds to preclude shimmy occurring at about 3000 pounds as compared to a force of 5000 pounds necessary to caster the wheel.

In a modification of the anti-shimmy means of this invention, a valve is interposed in the hydraulic return line from the steering mechanism and is operated by the deflection of the shock strut to control the return flow in accordance with the degree of deflection, which bears a relation to the tendency of the wheel to shimmy, so that shimmy is prevented under those conditions which give rise to it.

It will be seen that the hydraulic steering mechanism incorporating the anti-shimmy means of this invention prevents shimmy from starting, so that the necessary free castering of the wheel is not impaired and that the mechanism is simple, sure in operation and self-adjusting to accommodate the conditions encountered in actual operation.

For a more complete understanding of the invention, reference may be had to the accompanying drawings, in which:

Figure 1 is a perspective view of a steerable nose wheel for aircraft embodying the steering mechanism of this invention;

Fig. 2 is an enlarged view, shown partly in section, of the steering mechanism and the control system therefor, the control lever being in centered or neutral position;

Fig. 5 is a fragmentary perspective view of the shock strut carrying the shock strut deflection-responsive valve; and Figs. 6, 6A, 6B, 6C and 6D show the deflection-responsive valve in different positions, according with the degree of deflection of the shock strut.

Figure 3:
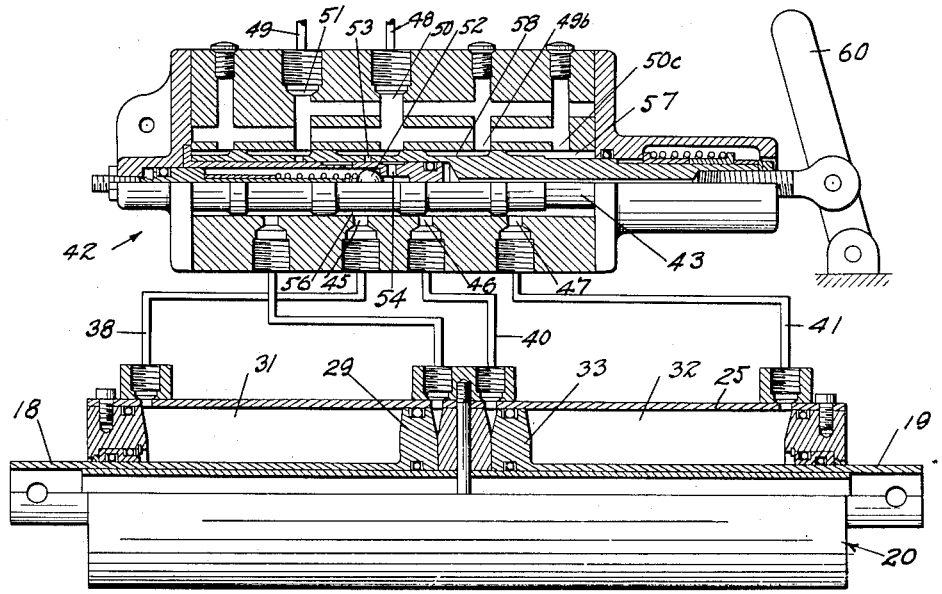
Figs. 3 and 4 are similar views, showing the relation of the operating parts when the control levers are turned to steer to the left and to the right, respectively.

Referring to Fig. 1 of the drawings, numeral 10 designates the usual shock strut for the steerable nose wheel of tricycle landing gear, and includes the fork and axle combination 11, the wheel 12 and the nutcracker linkage 13 by which the wheel is steered and which is attached to a ring assembly 14 which turns with respect to the fixed strut 10 to allow the wheel 12 to caster about the axis of the strut. A support member 15 securely fixed to the strut 10 supports the steering unit 20 of the present invention by means of a pair of rails 16 on which it is slidably mounted by ears 17. One end of the steering unit 20 is connected by a third rod 18 to the support member 15 and a reciprocating rod 19 operated by the unit 20, projects from its other end and is attached to a cross-head 21 which is slidably mounted on the two support rails 16 and is connected by a steering arm 22 to ring assembly 14 so as to turn the wheel 12 through nutcracker linkage 13 in one direction or the other.

The unit 20, shown in quarter section in Fig. 2, consists of a tubular casing 25 closed at one end by a cap 26 having an opening containing sealing gland 28 through which passes the rod 18 attached to the aforementioned support 15, as shown in Fig. 1. The inner end of rod 18 terminates in a piston 29 which reciprocates within the housing 25 between the end plug 26 and a fixed sealing diaphragm 30, which is located at the mid-point of the housing 25 and divides the housing interior into two chambers 31 and 32.

The other or right-hand end of casing 25 as seen in Fig. 2 is closed by plug 27 having an opening containing sealing gland 28a through which passes the rod 19 shown in Fig. 1. The rod 19, which attaches to the cross-head 21 at its outer end carries a piston 33 at its inner end, which operates within the chamber 32 of casing 25. Piston rods 18 and 19 are tubular and slide along centering tube 30a fixed to the diaphragm 30, as shown in Fig. 2.

Chamber 31 is provided with two ports 34 and 35 leading through the wall of the housing 25, and chamber 32 has two like ports 36 and 37 leading through the wall of housing 25. Ports 34, 35, 36 and 37 are connected respectively by flexible fluid lines 38, 39, 40 and 41 to corresponding ports 44, 45, 46 and 47 in the casing of a steering control unit 42 which is located in the aircraft cockpit at a point where the operating lever 60 is within convenient reach of the pilot. A flexible fluid pressure supply line 48 leading from a suitable source, not shown, and a flexible fluid return line 49 are connected respectively to ports 50 and 51 in the opposite side of the casing of control unit 42. Optionally interposed in return line 49 is shut-off valve 59, to be described.

The pressure fluid supply port 50 in the casing of control valve 42 communicates through spaced passages 50a, 50b and 50c with axial chamber 42a. Similarly, fluid return port 49 communicates through passages 49a and 49b with chamber 42a at two spaced points intermediate the three supply passages 50a, 50b and 50c, as shown in Fig. 2.

Axially slidable in passage 42a of control valve 42 and connected to lever 60 for that purpose is control rod 43 having spaced circumferential ribs 43a defining five annular passages which register with passages 49a, 49b, 50a, 50b and 50c when the rod 43 and lever 60 are in the neutral or centered position shown in Fig. 2. Also in this neutral or centered position of rod 43 and lever 60, the ribs 43a overlap half of each of the ports 44, 45, 46 and 47, so as to half close them for the purposes to be explained.

Control rod 43 is hollow and slidably contains constrictor valve body 55 which is anchored to the left-hand end cap 61 of the casing of control valve 42 as seen in Fig. 2, so that control valve 43 telescopes or moves axially along fixed constrictor valve body 55 as lever 60 is manipulated. The spring-pressed constrictor ball valve 52 within fixed valve body 55 reduces the pressure of the fluid entering ports 45 and 46 from port 50b through radial orifices 53 and 54 in rod 43 and constrictor valve body 55, respectively, which orifices are aligned when the rod 43 and lever 60 are in the neutral or centered position shown in Fig. 2. The leakage fluid passed by constrictor valve 52 is returned to passage 49a through passages 55a.

Slidably mounted within constrictor valve body 55 is a slidable member 62 threaded at one end into end cap 61 and retained in position by lock nut 63. A screw driver slot in the threaded end of member 62 is provided for turning it either clockwise or counter-clockwise to increase or decrease the tension on spring 66 which presses constrictor valve 52 against its seat in constrictor valve body 55. This adjustment controls the amount of bleedoff and, therefore, the pressure desired for the centered position.

In operation of the steering mechanism of this invention in the neutral condition shown in Fig. 2 fluid under pressure, such as oil, enters port 50 from a suitable pressure source connected to supply pipe 48. The supply oil has its pressure reduced to a predetermined amount by bleeding through the restrictor valve 52 after passing through orifice 53 in the wall of rod 43 and orifice 54 in constrictor valve body 55, these orifices being aligned when lever 60 is in the neutral or centered position shown in Fig. 2.

The fluid under reduced pressure then feeds through annular passage 56 and both ports 45 and 46, which are connected thereto, and passes through lines 38 and 40 to the steering unit 20 mounted on nose wheel strut 10 by support member 15, as shown in Fig. 1. Fluid from line 38 enters chamber 31 and acts against piston 29 to hold the entire unit 20 to the left, as shown. Fluid from line 40 simultaneously enters chamber 32 and forces piston 33 to the right to hold it in the position shown at the same time that fluid from line 38 enters chamber 31 to hold piston 29 against movement to the right, so that crosshead 21 is held centered against any movement to either right or left by the equal pressure of the fluid in chambers 31 and 32.

Accordingly, there is no unequal force or restraint imposed on the steering linkages from cross-head 21 through parts 22, 14, and 13 to the fork 11, so that the wheel 12 is free to caster. However, because ports 45 and 46 are partly open, there is always a predetermined centering load on the pistons 29 and 33 equivalent to the aforementioned load of 4000 pounds holding the wheel 12 against shimmy, which occurs around 3000 pounds, but free castering, requiring a load of 5000 pounds on the wheel 12, is not impaired.

Assuming that the aircraft is moving over the ground and the pilot turns the aircraft by means of his flight controls, the wheel 12 will swivel or caster in the proper direction as soon as the load against the wheel is enough to overcome the pressure of the fluid in either chamber 31 or 32 and as soon as the load against the wheel 12 is released or falls below the predetermined value, the fluid pressure centers the wheel.

If the pilot wishes to turn, say to the left, while the aircraft is taxiing slowly so that its motion is not sufficiently high to exert enough force on the wheel 12 to caster it, he moves the steering lever 60 in the cockpit to the left to the position shown in Fig. 3. This moves the rod 43 to the left and places the orifices 53 and 54 out of alignment and breaks the communication between annular passage 56 and port 46, so that fluid under pressure from supply line 48 is no longer restricted by valve 52, but flows directly through annular passage 56, port 45 and line 38 to chamber 31 to tend to hold piston 29 to the right and thus to hold the unit 20 fixed on rails 16 against shimmy.

However, movement of rod 43 to the left, placed annular passage 57 into communication with port 47, while annular passage 58, which was in communication with port 47 for return flow in the centered position of Fig. 2, is now moved to communicate with port 46 for return flow. Pressure fluid now passes from supply pipe 48, ports 50 and 50c, annular passage 57, port 47, line 41 and then to the chamber 32 of the steering unit 20 to force the piston 33, rod 19 and cross-head 21 to the left so as to steer the wheel 12 to the left. As the piston 33 moves to the left, the fluid in chamber 32 is forced through line 40 to the port 46, annular passage 58, and ports 49b and 51 through return line 49 of the fluid system.

In order to steer the wheel to the right, the pilot moves lever 60 to the right which moves the rod 43 to the right into the position shown in Fig. 4, and the exact reverse action from that described in connection with Fig. 3 takes place. Thus, restrictor valve 52 again is rendered inactive by lack of registry of ports 53 and 54 and port 46 remains in communication with pressure port 50b through annular passage 56 as in the case of the centered condition of Fig. 2, so that pressure fluid from line 48, port 50b, annular passage 56, port 46, line 40, port 36 and chamber 32 holds piston 33 to the right against shimmy. Meanwhile, pressure fluid also communicates with chamber 31 by ports 50a and 44, line 39, and port 35 to move piston 29 and rod 18 to extreme left-hand position from the position shown in Fig. 2. This results in movement of the casing 25 and crosshead 21 along the rails 16 and 17 to turn the wheel 12 to the right.

Figure 4:
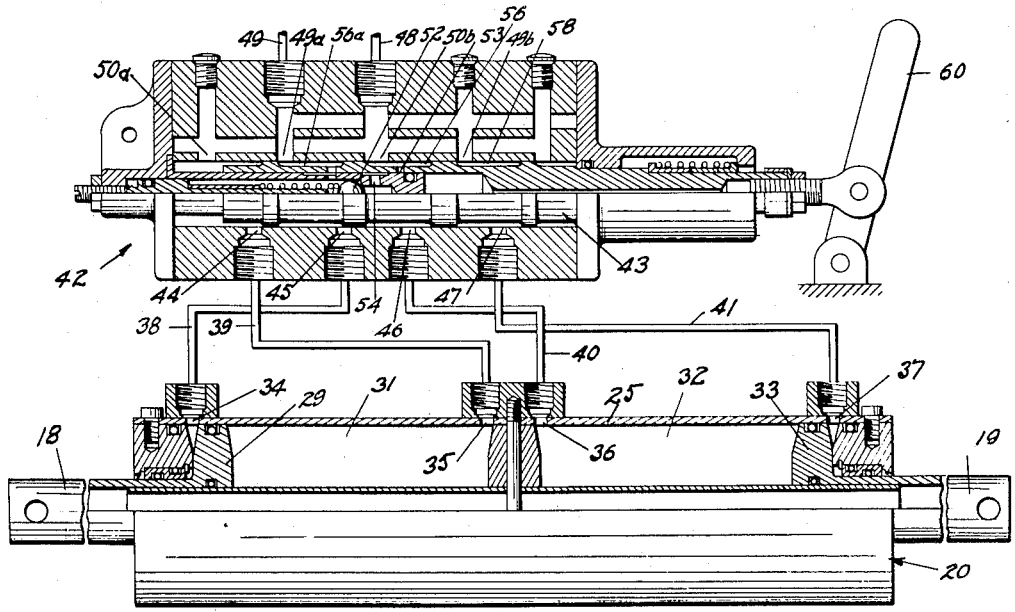

Positioning of rod 43 to the right as in Fig. 4, also opens return line 49 through port 49b, annular passage 58, port 47, line 41 and port 37 to chamber 32 behind piston 33 to allow the fluid to be forced thereby to the return line. Similarly, return line 49 is opened through port 49a, annular passage 56a, port 45, line 38 and port 34 to chamber 31 by movement of piston 29 to the left.

By moving handle 60 half of its full travel either to the left or to the right, the pilot will obtain a smooth turning rate due to orifice 53 being in communication with orifice 54 during this range, so that fluid at a reduced pressure flows to steering cylinder 20. In the event a sudden or fast turning rate is desired, the remaining travel of handle 60 will force orifices 53 and 54 out of registry, thereby cutting off relieving pressure and allowing full line pressure from 48 to be available for steering the wheel 12.

Although a reciprocating form of steering mechanism 20 has been shown and described, it will be understood that the equivalent rotary mechanism operating on the same principle may be employed with equal facility.

One of the most critical periods for shimmy is at the time of touch down or just prior to take-off when the nose gear strut 10 is either extending or compressing out of the normal operating range due to reduction of the loading on the tire, which means a smaller footprint area, and therefore, less ground resistance. The smaller the ground resistance the more sensitive a wheel becomes to shimmy. This invention provides an alternate means for varying the centering pressure from the aforementioned predetermined reduced holding pressure to the full available line pressure in cases where that will be found necessary, such as on heavily loaded cargo aircraft, for example. This is accomplished according to the present invention by utilizing the amount of deflection of the landing gear shock strut 10 for controlling the rate of pressure change needed to effectively prevent shimmy.

Accordingly, deflection-responsive valve 59 is mounted on the ring assembly 14 as shown in Fig. 5, and comprises valve body 64 containing a rotatable valve 65 through which pass a series of parallel orifices 66, as shown in Fig. 6. Valve body 64 is connected in the fluid return line 49 and the projecting axial stem 67 of valve 65 is attached to an arm and link combination 68 which connects it to the nutcracker linkage 13. As strut 10 compresses or extends, valve 65 will also oscillate within valve body 64 from the rest position shown in Fig. 6 to the various angular positions shown in Figs. 6A to 6D.

The angle of rotation of valve 65 is so timed that when strut 10 is extended to a predetermined length, valve 65 will assume the position shown at Fig. 6C, blocking the return flow of fluid in line 49 and making the constrictor or relief valve 52 inoperative. At the same time, since line 49 is then blocked, there can be no displacement of fluid in steering mechanism 20 so that the centered position of the wheel 12 will remain locked under full pressure. This remains true from this predetermined position shown in Fig. 6C to full strut 10 extension as indicated by the position of valve 65 in Fig. 6D. The opposite will be true when strut 10 is compressing from the indicated position of valve 65 in Fig. 6D.

It will be understood that Fig. 6 shows the position of valve 15 with strut 10 in the static position, Fig. 6A shows the valve 65 position when strut 10 is in fully compressed position, and Fig. 6B the position of valve 65 with strut 10 at the end of normal operating range and in such position that any further extension of the strut 10 will gradually cut off the flow of fluid in line 49 until it is completely cut off by valve 65 as in Fig. 6C.

When deflection responsive valve 59 is used in conjunction with the steering mechanism of Figs. 1 to 4, the valve 65 will, in the critical range depicted by Figs. 6–6D, give full line pressure for the centered position, which not only assures centering of the wheel for retracting, but at the same time, makes the steering valve 20 inoperative as a safety measure against inadvertent operation of the steering lever 60 by the pilot at take-off, touch down or when the wheel 12 is retracted.

Although preferred embodiments of the invention have been illustrated and described herein, it is to be understood that the invention is not limited thereby, but is susceptible of changes in form and detail within the scope of the appended claims.

I claim:

1. In mechanism for steering a supporting wheel of a vehicle and mounted thereon for castering about a substantially vertical axis in response to a predetermined lateral force on said wheel, the combination of a source of fluid pressure capable of applying a force in excess of said castering force, a cylinder connected to said source, a piston in said cylinder adapted to be driven by fluid pressure from said source, operative connections between said piston and said wheel for steering the same about said axis, valve means interposed between said source and said cylinder for controlling the supply of pressure fluid thereto to turn the wheel at will, and a second connection between said source and said cylinder for applying a predetermined force on said piston less than the said castering force to retain said piston in a substantially fixed position relative to said cylinder and prevent unintended turning and shimmying of said wheel until overcome by a force greater than said predetermined force.

2. In mechanism for steering a supporting wheel of a vehicle and mounted thereon for castering about a substantially vertical axis in response to a predetermined lateral force on said wheel, the combination of a source of fluid pressure capable of applying a force in excess of said castering force, a cylinder connected to said source, a piston in said cylinder adapted to be driven by fluid pressure from said source, operative connections between said piston and said wheel for steering the same about said axis, valve means interposed between said source and said cylinder for controlling the supply of pressure fluid thereto to turn the wheel at will, and a second connection between said source and said cylinder and controlled by said valve means for applying a predetermined fluid pressure to said piston less than the said castering force to center said wheel and restrain said piston against movement relative to said cylinder with a force proportional to said predetermined force and thereby prevent unintended turning of said wheel.

3. In mechanism for steering a supporting wheel of a vehicle and mounted thereon for castering about a substantially vertical axis in response to a predetermined lateral force on said wheel, the combination of a source of fluid pressure capable of applying a force in excess of said castering force, a piston and cylinder combination connected to said source and adapted to be driven by fluid pressure from said source, operative connections between said combination and said wheel for steering the same about said axis, valve means interposed in said connection between said source and said combination for controlling the supply of pressure fluid thereto to steer the wheel at will, and a second connection between said source and said combination for applying a predetermined fluid pressure to said combination less than the said castering force to center said wheel and restrain said piston against movement relative to said cylinder with a force proportional to said predetermined force and thereby prevent unintended turning of said wheel.

4. In mechanism for steering a supporting wheel of a vehicle and mounted thereon for castering about a substantially vertical axis in response to a predetermined lateral force on said wheel, the combination of a source of fluid pressure capable of applying a force in excess of said castering force, a cylinder element connected to said source, a piston element in said cylinder element adapted to be driven by fluid pressure from said source, operative connections between one of said elements and said wheel for steering the same about said axis, valve means interposed in said connection between said source and said cylinder element for controlling the supply of pressure fluid thereto to turn the wheel at will, and a second connection between said source and said cylinder element supplying fluid under pressure to said cylinder element to hold said piston element and cylinder element against relative movement, said pressure being sufficient to prevent unintended turning of said wheel and less than said castering force.

5. In mechanism for steering a supporting wheel of a vehicle and mounted thereon for castering about a substantially vertical axis in response to a predetermined lateral force on said wheel, the combination of a source of fluid pressure capable of applying a force in excess of said castering force, a cylinder connected to said source by a pressure line, a return fluid line connected to said cylinder and leading therefrom, a piston in said cylinder between said pressure and return line connections thereto and adapted to be driven by fluid pressure from said source and force the fluid into said return line, operative connections between said piston and said wheel for steering the same about said axis, valve means interposed in said pressure line for controlling the supply of pressure fluid thereto to turn the wheel at will, a second valve in said return line for opening and closing said line, and means responsive to the vehicle load on said wheel for actuating said second valve to close said return line and prevent turning of said wheel when the latter is free of vehicle load.

6. In mechanism for steering a supporting wheel of a vehicle and mounted thereon for castering about a substantially vertical axis in response to a predetermined lateral force on said wheel, the combination of a source of fluid pressure capable of applying a force in excess of said castering force, a cylinder connected to said source by a pressure line, a return fluid line connected to said cylinder and leading therefrom, a piston in said cylinder between said pressure and return line connections thereto and adapted to be driven by fluid pressure from said source and force the fluid into said return line, operative connections between said piston and said wheel for steering the same about said axis, first valve means interposed in said pressure and return lines for controlling the supply and return of fluid to and from said cylinder to steer the wheel at will and pressure reducing means interposed between said source and said cylinder to apply sufficient pressure on said piston to prevent unintended turning of said wheel, said pressure being less than said castering force.

7. In mechanism for steering a supporting wheel of a vehicle and mounted thereon for castering about a substantially vertical axis in response to a predetermined lateral force on said wheel, the combination of a source of fluid pressure capable of applying a force in excess of said castering force, a cylinder connected to said source by a pressure line, a return line connected to said cylinder and leading therefrom, a piston in said cylinder between said pressure and return line connections thereto and adapted to be driven by fluid pressure from said source and force the fluid into said return line, operative connections between said piston and said wheel for steering the same about said axis, valve means interposed in said pressure and return lines for controlling the supply and return of pressure fluid thereto and therefrom to turn the wheel at will, and a pressure reducing connection between said source and said cylinder and controlled by said valve means for applying a force on said piston sufficient to prevent unintended turning of said wheel and less than said castering force.

8. In mechanism for steering a supporting wheel of a vehicle and mounted thereon for castering about a substantially vertical axis in response to a predetermined lateral force on said wheel, the combination of a source of fluid pressure capable of applying a force in excess of said castering force, a container connected to said source by a pressure line, a return line connected to said container and leading therefrom, a piston in said container between said pressure and return line connections thereto and adapted to be driven by fluid pressure from said source and force the fluid into said return line, operative connections between said piston and said wheel for steering the same about said axis, valve means interposed in said pressure and return lines for controlling the supply and return of pressure fluid thereto and therefrom to turn the wheel at will, a second connection between said source and said container and controlled by said valve means, and a second piston in said container and connected to said wheel for applying a predetermined force thereto less than the said castering force to prevent unintended turning of said wheel.

9. In mechanism for steering a supporting wheel of a vehicle and mounted thereon for castering about a substantially vertical axis in response to a predetermined lateral force on said wheel, the combination of a support for said wheel rotatable about said axis, a source of fluid pressure capable of applying a force in excess of said castering force, a fluid motor connected to said source and adapted to be driven thereby, operative connections between said motor and said support for steering the wheel about said axis, valve means interposed between said source and said motor for controlling the supply of pressure fluid thereto to turn the support at will, and fluid pressure means connected to said support for applying a predetermined counterforce thereto sufficient to prevent unintended turning of said support, said counterforce being less than said castering force.

10. In mechanism for steering a supporting wheel of a vehicle and mounted thereon for castering about a substantially vertical axis in response to a predetermined lateral force on said wheel, the combination of a support for said wheel rotatable about said vertical axis, a source of fluid pressure capable of applying a force in excess of said castering force, a fluid motor mounted on said vehicle and connected to said source and adapted to be driven thereby, a crank on said support, operative connections between said motor and the crank for steering the wheel about said axis, valve means interposed between said source and said motor for controlling the supply of pressure fluid thereto to turn the support at will, and fluid pressure means connected to the crank on said support for applying a predetermined counterforce thereto sufficient to prevent unintended turning of said wheel, said counterforce being less than said castering force.

11. In mechanism for steering a supporting wheel of a vehicle and mounted thereon for castering about a substantially vertical axis in response to a predetermined lateral force on said wheel, the combination of a source of fluid pressure capable of applying a force in excess of said castering force, a piston and cylinder combination connected to said source and adapted to be driven by fluid pressure from said source, operative connections between said combination and said wheel for steering the same about said axis, valve means interposed in said connection between said source and said combination for controlling the supply of pressure fluid thereto to turn the wheel at will, a second piston and cylinder combination connected to said source and controlled by said valve means for opposing said first piston and cylinder combination, and operative connections between said second piston and cylinder combination and said wheel for applying a predetermined counterforce thereto less than the said castering force to prevent unintended turning of said wheel.

12. In mechanism for steering a supporting wheel of a vehicle and mounted thereon for castering about a substantially vertical axis in response to a predetermined lateral force on said wheel, the combination of a source of fluid pressure capable of applying a force in excess of said castering force, a fluid motor, a pressure fluid line connected to said source and to said motor for driving the same, a fluid return line leading from said motor, operative connections between said motor and said wheel for steering the same, a valve interposed in said fluid supply line for controlling the supply of pressure fluid to said motor to turn the wheel at will, a second valve in said return line, and means movable in response to the vehicle load on said wheel for actuating said second valve to prevent substantial flow of liquid through said return line when said wheel is free of vehicle load.

13. In mechanism for steering a supporting wheel of a vehicle and mounted thereon for castering about a substantially vertical axis in response to a predetermined lateral force on said wheel, the combination of a source of fluid pressure capable of applying a force in excess of said castering force, a fluid motor connected to said source and adapted to be driven thereby, operative connections between said motor and said wheel for steering the same about said axis, valve means interposed between said source and said motor for controlling the supply of pressure fluid thereto to turn the wheel at will, and counterpressure means responsive to the vehicle load on said wheel and connected to said wheel for applying a predetermined counterforce thereto to prevent unintended turning of said wheel when said wheel is substantially relieved of vehicle load.

14. In mechanism for steering a supporting wheel of a vehicle and mounted thereon for castering about a substantially vertical axis in response to a predetermined lateral force on said wheel, the combination of a source of fluid pressure capable of applying a force in excess of said castering force, a fluid motor, a pressure fluid line connected to said source and to said motor for driving the same, a fluid return line leading from said motor, operative connections between said motor and said wheel for steering the same, a valve interposed in said fluid supply line for controlling the supply of pressure fluid to said motor to turn the wheel at will, a second valve in said return line, a shock absorber interposed between said vehicle and said wheel, means responsive to deflection of said shock absorber, and operative connections between said responsive means and said second valve for creating a back pressure on said motor to prevent unintended turning of said wheel when said shock absorber is not deflected by vehicle load.

15. In mechanism for steering a supporting wheel of a vehicle and mounted thereon for castering about a substantially vertical axis in response to a predetermined lateral force on said wheel, the combination of a source of fluid pressure capable of applying a force in excess of said castering force, a cylinder connected to said source by a pressure line, a return fluid line connected to said cylinder and leading therefrom, a piston in said cylinder between said pressure and return line connections thereto and adapted to be driven by fluid pressure from said source and force the fluid into said return line, operative connections between said piston and said wheel for steering the same about said axis, valve means interposed in said pressure line for controlling the supply of pressure fluid thereto to turn the wheel at will, a second valve in said return line, a shock absorber interposed between the vehicle and said wheel and subject to deflection in accordance with variations in the load on said wheel, and operative connections between said shock absorber and said second valve for applying a predetermined back pressure on said piston to prevent unintended turning of said wheel when said shock absorber is not deflected by vehicle load.

16. In mechanism for steering a supporting wheel of a vehicle and mounted thereon for castering about a substantially vertical axis in response to a predetermined lateral force on said wheel, the combination of a source of fluid pressure capable of applying a force in excess of said castering force, a cylinder connected to said source by a pressure line, a return fluid line connected to said cylinder and leading therefrom, a piston in said cylinder between said pressure and return line connections thereto and adapted to be driven by fluid pressure from said source and force the fluid into said return line, operative connections between said piston and said wheel for steering the same about said axis, valve means interposed in said pressure line for controlling the supply of pressure fluid thereto to turn the wheel at will, a second valve in said return line and rotatable therein to vary the size of the opening therethrough in accordance with the angle of its rotation, a crank for rotating said second valve, a shock absorber interposed between the vehicle and said wheel and having a part subject to deflection in accordance with variations in the load on said wheel, and operative connections between said shock absorber part and said crank for applying a predetermined back pressure on said piston less than the said castering force to prevent unintended turning of said wheel.

17. In mechanism for steering a supporting wheel of a vehicle and mounted thereon for castering about a substantially vertical axis in response to a predetermined lateral force on said wheel, the combination of a source of fluid pressure capable of applying a force in excess of said castering force, a cylinder connected to said source by a pressure line, a return fluid line connected to said cylinder and leading therefrom, a piston in said cylinder between said pressure and return line connections thereto and adapted to be driven by fluid pressure from said source and force the fluid into said return line, operative connections between said piston and said wheel for steering the same about said axis, valve means interposed in said pressure line for controlling the supply of pressure fluid thereto to turn the wheel at will, a second valve in said return line having a plurality of passages therethrough and rotatable therein to variably open and close said valve passages and thereby vary the size of the opening therethrough in accordance with the angle of its rotation, a crank for rotating said second valve, a shock absorber interposed between the vehicle and said wheel and having a part subject to deflection in accordance with variations in the load on said wheel, and operative connections between said shock absorber part and said crank for applying a predetermined back pressure on said piston less than the said castering force to prevent unintended turning of said wheel.

18. In mechanism for steering a supporting wheel of a vehicle and mounted thereon for castering about a substantially vertical axis in response to a predetermined lateral force on said wheel, the combination of a source of fluid pressure capable of applying a force in excess of said castering force, a cylinder connected to said source by a pressure line, a return fluid line connected to said cylinder and leading therefrom, a piston in said cylinder between said pressure and return line connections thereto and adapted to be driven by fluid pressure from said source and force the fluid into said return line, operative connections between said piston and said wheel for steering the same about said axis, valve means interposed in said pressure line for controlling the supply of pressure fluid thereto to turn the wheel at will, a second valve in said return line having a plurality of parallel passages therethrough and rotatable therein to variably open and close said valve passages and thereby vary the size of the opening therethrough in accordancec with the angle of its rotation, a crank for rotating said second valve, a shock absorber interposed between the vehicle and said wheel and having a part subject to deflection in accordance with variations in the load on said wheel, and an operative connection between said shock absorber part and said crank for rotating said second valve to apply a back pressure on said piston to prevent unintended turning of said wheel.

19. The mechanism set forth in claim 6 comprising means to render said pressure reducing means ineffective to apply back pressure when said first valve means is actuated to steer said vehicle.

References Cited in the file of this patent

UNITED STATES PATENTS

| 2,366,382 | Burton | Jan. 2, 1945 |
| 2,418,325 | Wassall | Apr. 1, 1947 |
| 2,622,827 | Hayman | Dec. 23, 1952 |